(No Model.) 2 Sheets—Sheet 1.
J. I. C. NAFF.
GRASS SEED HARVESTER.
No. 304,228. Patented Aug. 26, 1884.
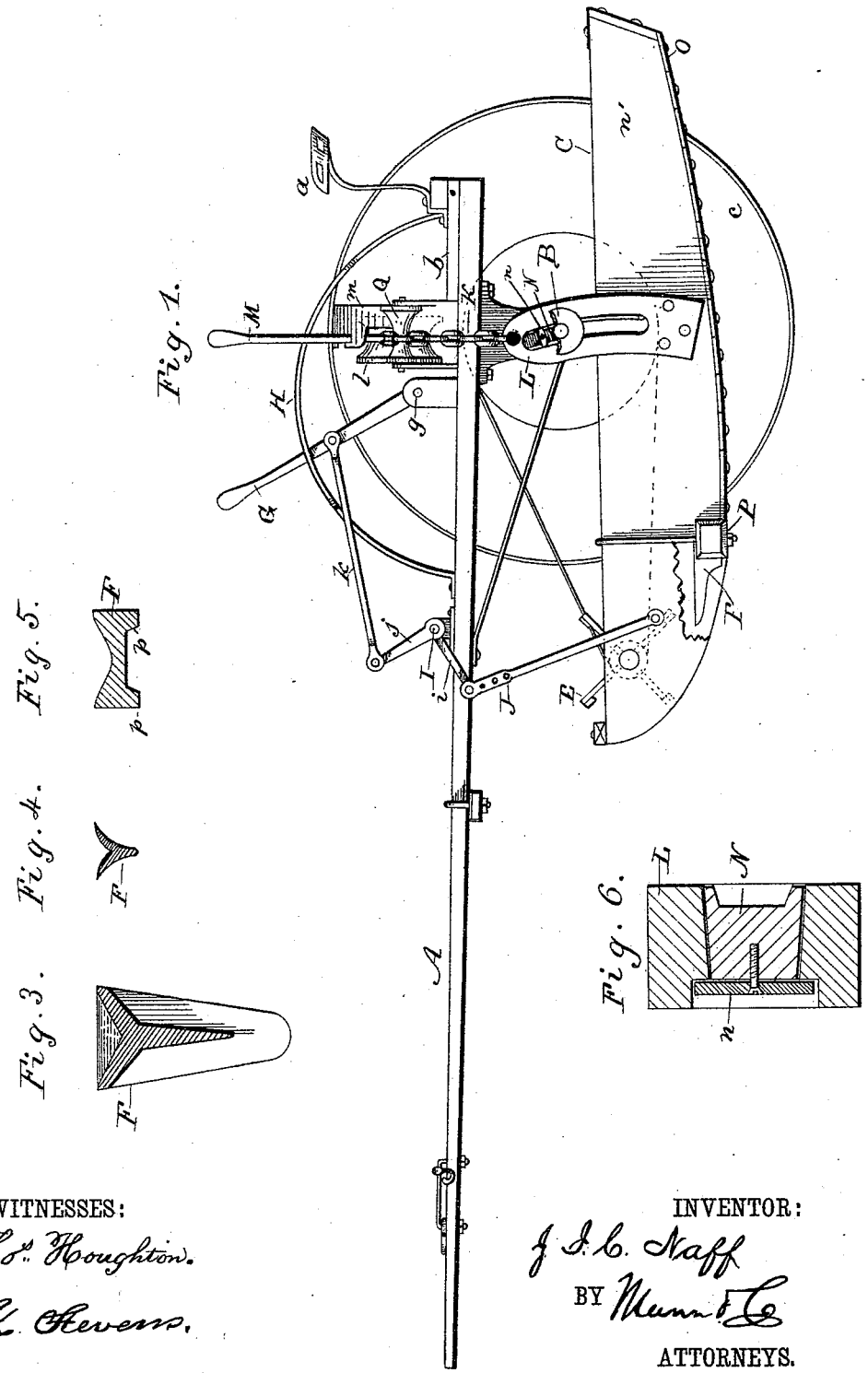
WITNESSES:
Thos. Houghton.
W. X. Stevens.
INVENTOR:
J. I. C. Naff
BY Munn & Co.
ATTORNEYS.

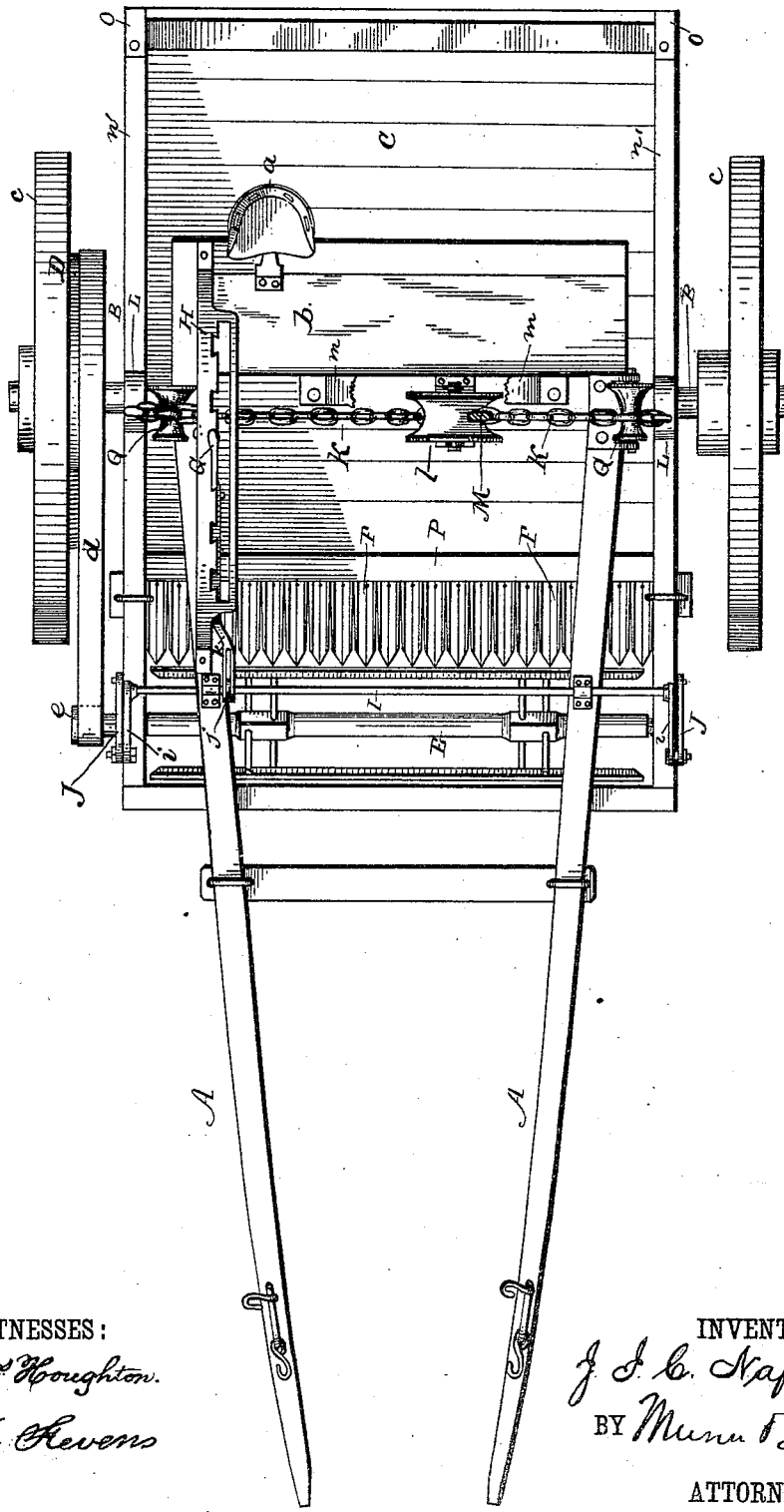

UNITED STATES PATENT OFFICE.

JACOB I. C. NAFF, OF WINCHESTER, KENTUCKY.

GRASS-SEED HARVESTER.

SPECIFICATION forming part of Letters Patent No. 304,228, dated August 26, 1884.

Application filed November 15, 1883. (No model.)

*To all whom it may concern:*

Be it known that I, JACOB I. C. NAFF, a citizen of the United States, residing at Winchester, in the county of Clark and State of Kentucky, have invented certain new and useful Improvements in Grass-Seed Harvesters, of which the following is a description.

My invention relates to that class of grass-seed harvesters in which a comb having trough-shaped teeth is drawn along, elevated somewhat above the ground, to strip the seed from the standing grass; and it has for its object to provide means whereby the comb may guard itself from being choked by large weeds or small bushes; means whereby the comb may be quickly raised or depressed to follow the height of the grass; means whereby the body or seed-receptacle may be elevated for traveling or for passing over obstacles and to adapt it to different kinds of grasses, and means whereby either of said elevations may be made without changing the tension of the reel-belt.

To this end my invention consists in comb-teeth of peculiar form, in peculiar elevating devices, and in peculiar guides and bearing-blocks for the axle, as hereinafter described and claimed, reference being had to the accompanying drawings, in which—

Figure 1 is a side elevation of my seed-harvester with the front wheel removed. Fig. 2 is a plan view of the same with both wheels on. Fig. 3 is a transverse vertical section of a comb-tooth near its shank. Fig. 4 is a similar section of the same near its point. Fig. 5 is a similar section through the tooth-shank, and Fig. 6 is a horizontal section through one of the bearing-yokes.

A represents a pair of thills or shafts rigidly framed together at their rear ends, and provided with a seat, $a$, and platform $b$ for the driver's convenience. This frame is mounted on a wheel-axle, B, which is bent upward along its middle portion over the load of seed gathered and carried in the body C. This axle is mounted, as usual, on two wheels, $c$, one of which carries a belt-pulley, D, from which a belt, $d$, runs to a pulley, $e$, on the reel E. This reel is journaled in forward-projecting portions of the sides of the body C, and acts to lay the grass-tops back over the comb-teeth F. These teeth are trough-shaped above, having sharp corners along their two edges, and they are located so close together as to strip the seeds from the stalks or branches of grass, allowing the grass to draw through between them as the harvester advances over it. The troughs receive the seeds thus stripped off and they are drawn back into the body C by a scraper operated by hand. Each tooth is shaped to a long tapering point, sharpened at its edges to cut weeds and bushes that might otherwise clog and hamper the machine. These sharp-pointed teeth are very effective for the purpose stated, because each bush will be caught between two sharp edges, and as the machine advances the bush is bent forward, giving an easy slanting cut. To raise and lower the comb to accommodate the varying height of the grass, I provide a hand-lever, G, pivoted to the frame at $g$, to be worked to and fro by the driver.

H is a curved bar having a number of notches into which the lever G may spring.

I is a rock-shaft provided with two arms, $i$, connected by link J with the forward end of the body C, near the journals of the reel. $j$ is another radial arm of shaft I, nearly at right angles to the radial plane of arms $i$, and connected with the hand-lever G by a rod, $k$.

In operating this device the driver springs the hand-lever out of engagement with its retaining-notches in bar H, then moves it forward or backward, as he wishes the comb to be lowered or raised, and again fixes the handle in the nearest notch of bar H. The connecting-link J is provided with a number of adjusting-holes, whereby the vertical range of the comb may be raised or lowered.

The central portion of the body C is hung upon the frame by means of chains K, attached at one end to peculiarly-shaped yokes L, which are fixed to the sides of the body, and at the other end to the opposite sides of a winding-roller, $l$, which is pivoted to the frame and provided with an arm, M. This arm is adapted to engage a notched arc, $m$, secured to the frame. The yokes L are loop-shaped and bear against both the front and rear sides of the axle B, to slide nearly vertically, thereby to steady the body fore and aft; but as the reel is hung in said body and its pulley is belted to a pulley on the axle, any change in the position of the body is likely to change the tension of said belt and either damage it by too much strain or render it ineffective by too little strain. To avoid this I shape the yokes L in arcs of circles from the bearings of the reel as centers. By means of the arm M the body may be raised or lowered, as desired, and the chains will temporarily support the body; but in order that a heavy load may be supported in the body I interpose bearing-blocks N between the top of the axle and the yokes, and by means of such blocks of different thicknesses the body may be made to rest on the axle at different heights. Two or more blocks may be used, one above the other. Each of these blocks is wedge-shaped in one direction to engage a similar wedge form in the yoke, and each block is provided with a button, $n$, to engage ledges on the yokes to keep said blocks in place when once inserted, and yet to render them easily changed. The body C is formed of two thick side planks, $n'$, having the bottom and rear end boards secured thereto by means of iron straps O and long screws reaching through said straps and boards into the edges of the side planks. The comb-teeth are each secured to a cross-beam, P, by screws, and the shank of each tooth is provided with side ribs, $p$, that the same may be more readily filed or ground to form a seat for the tooth on said beam. The pulleys Q, over which the chains K pass, are tapering forward to accommodate the line of the chains as the arc of the yokes carries said chains out of their vertical plane. An iron strap is bolted at its forward end to the comb-beam, and is screwed to the under side of the bottom boards along the middle of the body and to the rear end board.

What I claim as my invention, and wish to secure by Letters Patent, is—

1. The combination, with the mounted frame and body of a grass-seed harvester, of a comb having a series of metallic trough-shaped fingers, each provided with a tapering point having sharp edges, as shown and described.

2. The combination, with a thill-frame mounted on wheels, and a body vertically adjustable thereon, of two loop-shaped yokes, one secured to each side of said body to engage the axle, as described, and bearing-blocks shaped to fit into said yoke above the axle, as and for the purpose described.

3. The combination, with the loop-shaped yoke described, having ledges along one face beside its opening, and the opening having inclined sides, of one or more wedge-shaped blocks to fit said inclines, and buttons on said blocks to engage the aforesaid ledges, substantially as described.

JACOB I. C. NAFF.

Witnesses:
BENJ. F. CURTIS,
JNO. M. HODGKIN.